(12) United States Patent
Ozawa et al.

(10) Patent No.: US 10,394,146 B2
(45) Date of Patent: Aug. 27, 2019

(54) BINDER RESIN FOR TONERS, TONER, AND METHOD FOR PRODUCING SAME

(71) Applicant: Mitsubishi Chemical Corporation, Chiyoda-ku (JP)

(72) Inventors: Tadahiro Ozawa, Tokyo (JP); Yoko Tamura, Tokyo (JP); Kanako Funabashi, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/576,867

(22) PCT Filed: Jun. 1, 2016

(86) PCT No.: PCT/JP2016/066189
§ 371 (c)(1),
(2) Date: Nov. 27, 2017

(87) PCT Pub. No.: WO2016/194949
PCT Pub. Date: Dec. 8, 2016

(65) Prior Publication Data
US 2018/0173124 A1   Jun. 21, 2018

(30) Foreign Application Priority Data

Jun. 1, 2015 (JP) ................................ 2015-111332
Dec. 22, 2015 (JP) ................................ 2015-249773
Dec. 22, 2015 (JP) ................................ 2015-249774

(51) Int. Cl.
G03G 9/08 (2006.01)
G03G 9/087 (2006.01)
G03G 9/097 (2006.01)
C08L 67/02 (2006.01)

(52) U.S. Cl.
CPC .......... *G03G 9/08755* (2013.01); *C08L 67/02* (2013.01); *C08L 67/025* (2013.01); *G03G 9/081* (2013.01); *G03G 9/087* (2013.01); *G03G 9/0815* (2013.01); *G03G 9/0819* (2013.01); *G03G 9/0821* (2013.01); *G03G 9/08795* (2013.01); *G03G 9/08797* (2013.01); *G03G 9/09758* (2013.01); *C08L 2205/025* (2013.01)

(58) Field of Classification Search
CPC .......... G03G 9/08755; G03G 9/08795; G03G 9/08797; G03G 9/08758; C08L 67/02
USPC ...................................................... 430/109.4
See application file for complete search history.

(56) References Cited

U.S. PATENT DOCUMENTS

| | | | |
|---|---|---|---|
| 2010/0099037 A1 | 4/2010 | McAneney-Lannen et al. | |
| 2011/0003243 A1 | 1/2011 | Sacripante et al. | |
| 2011/0212396 A1 | 9/2011 | Farrugia et al. | |
| 2014/0377700 A1 | 12/2014 | Mine et al. | |
| 2015/0152219 A1* | 6/2015 | Tamura | C08G 63/78 528/296 |
| 2015/0291730 A1 | 10/2015 | Tamura et al. | |

FOREIGN PATENT DOCUMENTS

| | | |
|---|---|---|
| DE | 10 2011 003 584 A1 | 9/2011 |
| EP | 2 523 046 A2 | 11/2012 |
| EP | 2 862 885 A1 | 4/2015 |
| JP | 05-165252 A | 7/1993 |
| JP | 06-332250 A | 12/1994 |
| JP | 2003-162091 A | 6/2003 |
| JP | 2010-241878 A | 10/2010 |
| JP | 2010-285555 A | 12/2010 |
| JP | 2011-075960 A | 4/2011 |
| JP | 4740313 B2 | 8/2011 |
| JP | 2012-058337 A | 3/2012 |
| JP | 2013-231148 | 11/2013 |
| JP | 5465471 B2 | 4/2014 |
| JP | A-2014-101429 | 6/2014 |
| JP | 2014-137488 A | 7/2014 |
| JP | 2014-209246 A | 11/2014 |
| WO | 2013/187401 | 12/2013 |
| WO | 2014/088097 A1 | 6/2014 |

OTHER PUBLICATIONS

Office Action dated Jun. 11, 2018, in co-pending U.S. Appl. No. 15/577,585.
International Search Report dated Aug. 9, 2016 in PCT/JP2016/066250, filed on Jun. 1, 2016.
International Search Report dated Jul. 12, 2016 in PCT/JP2016/066189, filed on Jun. 1, 2016.
Extended European Search Report dated Mar. 23, 2018 in Patent Application No. 16803383.5.
Extended European Search Report dated Mar. 23, 2018 in Patent Application No. 16803403.1.
Office Action as received in corresponding KR Patent Application No. 10-2017-7034092 dated Feb. 15, 2019 w/English translation.
Office Action as received in corresponding KR Patent Application No. 10-2017-7034093 dated Feb. 15, 2019 w/English translation.
Office Action as received in the corresponding KR Patent Application No. 10-2017-7034093 dated Jun. 26, 2019 w/Machine translation obtained by Global osier.

* cited by examiner

*Primary Examiner* — Mark A Chapman
(74) *Attorney, Agent, or Firm* — Oblon, McClelland, Maier & Neustadt, L.L.P.

(57) ABSTRACT

A binder resin for toner of the present invention comprising: a polyester resin (A) which contains a constitutional unit derived from isosorbide and has a softening temperature of higher than 120° C.; and a polyester resin (B) different from the polyester resin (A), wherein the binder resin for toner has a pulverizability index of 25 or more.

19 Claims, No Drawings

BINDER RESIN FOR TONERS, TONER, AND METHOD FOR PRODUCING SAME

TECHNICAL FIELD

The present invention relates to a binder resin for toner, a toner, and a method for producing the toner.

This application is based upon and claims the benefit of priority of the prior Japanese Patent Application No. 2015-111332 filed in Japan on Jun. 1, 2015, the prior Japanese Patent Application No. 2015-249773 filed in Japan on Dec. 22, 2015, and the prior Japanese Patent Application No. 2015-249774 filed in Japan on Dec. 22, 2015, the entire contents of which are incorporated herein by reference.

BACKGROUND ART

In a method of obtaining an image by an electrophotographic printing method or an electrostatic charge developing method, an electrostatic charge image formed on a photoreceptor is developed with a toner charged by friction in advance and then fixed. In this process, the toner is required to firstly maintain a stable electric charge amount and to secondly exhibit fixability to the paper.

In addition, an apparatus to be used for obtaining an image by an electrophotographic printing method or an electrostatic charge developing method has a fixing section of a heating member, the temperature in the apparatus thus increases, and the toner is thus required not to block, namely, to exhibit storage stability.

Particularly in the fixing method using a heat roller, a decrease in temperature of the fixing section has been progressed from the viewpoint of energy saving, and the toner has been thus strongly required to exhibit low temperature fixability. In addition, a roller which is not coated with oil has been used as miniaturization of the apparatuses has been progressed, and the toner has been highly required to exhibit releasability from the heat roller, namely, non-offset property.

It is also required that dirt on the apparatus even at the time of continuous printing and fogging at the time of printing are not observed, that is, durability of the toner is required.

A binder resin for toner greatly affects the toner properties as described above, and a polystyrene resin, a styrene acrylic resin, a polyester resin, an epoxy resin, a polyamide resin, and the like are known. Recently, a polyester resin has particularly attracted attention since it exhibits excellent storage stability, low temperature fixability, non-offset property, durability, pulverizability at the time of production of toner, and the like and exhibits performances in a favorable balance.

For example, Patent Literature 1 proposes a toner exhibiting excellent low temperature fixability, hot offset resistance, glossiness, durability, and storage stability.

On the other hand, in recent years, a carbon neutral strategy has particularly attracted attention from the viewpoint of environmental protection such as suppression of global warming, and it has been actively attempted to change plastics derived from conventional petroleum raw materials to plastics derived from vegetable raw materials with lower environmental impact. The use of components derived from vegetable raw materials in toner is also investigated.

For example, Patent Literatures 2 and 3 propose a toner using a binder resin for toner containing a raw material component derived from vegetables.

CITATION LIST

Patent Literature

Patent Literature 1: JP 2011-75960 A
Patent Literature 2: JP 2010-285555 A
Patent Literature 3: JP 4740313 A

SUMMARY OF THE INVENTION

Problem to be Solved by the Invention

However, the resin for toner of Patent Literature 1 is hardly broken at the time of pulverization and the pulverizability is insufficient. The toner exhibits insufficient durability in the case of using the resin for toner described in Patent Literatures 2 and 3 in a toner.

An object of the invention is to provide a binder resin for toner which exhibits favorable pulverizability and can provide a toner exhibiting excellent storage stability, low temperature fixability, non-offset property, and durability, a toner using this, and a method for producing the toner.

Means for Solving Problem

The invention has the following aspects.

[1] A binder resin for toner containing a polyester resin (A) which contains a constitutional unit derived from isosorbide and has a softening temperature of higher than 120° C. and a polyester resin (B) different from the polyester resin (A), in which the binder resin for toner has a pulverizability index of 25 or more.

[2] The binder resin for toner according to [1], in which a ratio of the number of carbon atoms contained in a constitutional unit derived from isosorbide to the number of entire carbon atoms contained in the polyester resin (A) is from 0.1% to 30%.

[3] The binder resin for toner according to [1] or [2], in which the polyester resin (A) is a polycondensate of a monomer mixture containing either or both of a tri- or higher polycarboxylic acid and a trihydric or higher polyhydric alcohol in a range of from 0.1% to 80% by mole with respect to the total number of moles of entire acid components.

[4] The binder resin for toner according to any one of [1] to [3], in which a softening temperature of the polyester resin (B) is higher than 120° C.

[5] The binder resin for toner according to any one of [1] to [3], in which a softening temperature of the polyester resin (B) is 120° C. or lower.

[6] The binder resin for toner according to any one of [1] to [5], in which a ratio of the number of carbon atoms contained in a constitutional unit derived from isosorbide to the number of entire carbon atoms contained in the polyester resin (B) is less than 1%.

[7] The binder resin for toner according to any one of [1] to [6], in which a mass ratio of the polyester resin (A) to the polyester resin (B) is from 5:95 to 95:5.

[8] A toner containing the binder resin for toner according to any one of [1] to [7].

[9] A method for producing the toner according to [8], the method including a step of melting and kneading a mixture containing the polyester resin (A) and the polyester resin (B) and pulverizing a kneaded product thus obtained.

Effect of the Invention

According to the invention, it is possible to provide a binder resin for toner which exhibits favorable pulverizability and can provide a toner exhibiting excellent storage stability, low temperature fixability, non-offset property, and durability, a toner using this, and a method for producing the toner.

MODE(S) FOR CARRYING OUT THE INVENTION

<<Binder Resin for Toner>>

The binder resin for toner of the invention contains a polyester resin (A) and a polyester resin (B).

The binder resin for toner of the invention may further contain a binder resin other than the polyester resin (A) and the polyester resin (B) as long as the effect of the invention is not impaired.

<Polyester Resin (A)>

A "polyester resin" is a polycondensate of a monomer mixture containing a polycarboxylic acid and a polyhydric alcohol, and it contains a constitutional unit derived from a polycarboxylic acid and a constitutional unit derived from a polyhydric alcohol.

The polyester resin (A) contains at least a constitutional unit derived from isosorbide as the constitutional unit derived from a polyhydric alcohol. This makes the pulverizability favorable.

Examples of the polycarboxylic acid in the constitutional unit derived from a polycarboxylic acid may include aromatic dicarboxylic acids such as terephthalic acid, isophthalic acid, phthalic acid, dimethyl terephthalate, dimethyl isophthalate, diethyl terephthalate, diethyl isophthalate, dibutyl terephthalate, dibutyl isophthalate; and esters and acid anhydrides thereof; aliphatic dicarboxylic acids such as sebacic acid, isodecylsuccinic acid, dodecenylsuccinic acid, maleic acid, fumaric acid, adipic acid, succinic acid; and esters and acid anhydrides thereof; and tri- or higher polycarboxylic acids such as trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid, and esters and acid anhydrides thereof. These may be vegetable-derived substances or petroleum-derived substances, and any one kind thereof may be used singly or two or more kinds thereof may be used in combination.

As the polycarboxylic acid, aromatic dicarboxylic acids such as terephthalic acid and isophthalic acid and tri- or higher polycarboxylic acids are preferable. Trimellitic acid or an anhydride thereof is preferable as the tri- or higher polycarboxylic acid.

The polyester resin (A) may contain a constitutional unit derived from a polyhydric alcohol other than the constitutional unit derived from isosorbide as long as the effect of the invention is not impaired.

Examples of another polyhydric alcohol may include aliphatic diols such as ethylene glycol, neopentyl glycol, polyethylene glycol, 1,2-propanediol, 1,3-butanediol, 1,4-butanediol, diethylene glycol triethylene glycol, 1,4-cyclohexanedimethanol, and erythritane; aromatic diols such as polyoxypropylene(2.3)-2,2-bis(4-hydroxyphenyl)propane, polyoxyethylene(2.0)-2,2-bis(4-hydroxyphenyl)propane, polyoxypropylene(2.0)-2,2-bis(4-hydroxyphenyl)propane, polyoxypropylene(2.2)-polyoxyethylene(2.0)-2,2-bis(4-hydroxyphenyl)propane, polyoxypropylene(6)-2,2-bis(4-hydroxyphenyl)propane, polyoxypropylene(2.2)-2,2-bis(4-hydroxyphenyl)propane, polyoxypropylene(2.4)-2,2-bis(4-hydroxyphenyl)propane, and polyoxypropylene(3.3)-2,2-bis (4-hydroxyphenyl)propane; trihydric or higher alcohols such as sorbitol, 1,2,3,6-hexatetrol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, and 1,3,5-trihydroxymethylbenzene. These may be vegetable-derived substances or petroleum-derived substances, and any one kind thereof may be used singly or two or more kinds thereof may be used in combination.

Incidentally, the numerical values in the parentheses added after polyoxyethylene or polyoxypropylene indicate the average number of moles of oxyethylene groups or oxypropylene groups added.

As another polyhydric alcohol, ethylene glycol, neopentyl glycol, 1,2-propanediol, 1,3-butanediol, 1,4-butanediol, 1,4-cyclohexanedimethanol, polyoxyethylene(2.0)-2,2-bis(4-hydroxyphenyl)propane, polyoxypropylene(2.3)-2,2-bis(4-hydroxyphenyl)propane, and trihydric or higher alcohol are preferable. As the trihydric or higher alcohol, glycerin and trimethylolpropane are preferable.

The polyester resin (A) may further contain a constitutional unit derived from a monohydric alcohol, a constitutional unit derived from a monocarboxylic acid, and the like as long as the effect of the present invention is not impaired. In the case of containing these monovalent constitutional units, these monovalent constitutional units are likely to be present at the terminals of the molecular chains of the polyester resin. It is effective to contain a constitutional unit derived from a monohydric alcohol or a constitutional unit derived from a monocarboxylic acid at the terminal of polymer in order to improve the dispersibility of toner member, to improve the resistance to moisture absorption by the resin by adjusting the acid value of carboxylic acid and the hydroxyl value, and thus to stabilize the charging property of the toner.

Examples of the monohydric alcohol may include aromatic monohydric alcohols having 30 or less carbon atoms such as benzyl alcohol; and aliphatic monohydric alcohols having 30 or less carbon atoms such as oleyl alcohol, lauryl alcohol, cetyl alcohol, stearyl alcohol, and behenyl alcohol.

Examples of the monocarboxylic acid may include aromatic monocarboxylic acids having 30 or less carbon atoms such as benzoic acid, p-methylbenzoic acid, and cinnamic acid; and aliphatic carboxylic acids having 30 or less carbon atoms such as stearic acid, behenic acid, oleic acid, linoleic acid, and linolenic acid.

The content of the constitutional unit derived from isosorbide in the polyester resin (A) is preferably in a range in which the ratio of the number of carbon atoms contained in the constitutional unit derived from isosorbide to the number of entire carbon atoms contained in the polyester resin (A) (hereinafter referred to as the "isosorbide-derived carbon atom ratio" in some cases) is from 0.1% to 30%, The isosorbide-derived carbon atom ratio is more preferably from 0.1% to 20% and particularly preferably from 0.5% to 15%. The pulverizability of the binder resin for toner and the storage stability of the toner are superior when the isosorbide-derived carbon atomic ratio is equal to or more than the lower limit value. The durability of the binder resin for toner and the fixability of the toner are superior when the isosorbide-derived carbon atom ratio is equal to or less than the upper limit-value.

The content of the constitutional unit derived from isosorbide in the polyester resin (A) is preferably 0.1% by mole or more, more preferably from 0.1% to 50% by mole, still more preferably from 3% to 40% by mole, and particularly preferably from 5% to 30% by mole with respect to the total number of moles of the constitutional units derived from all the polycarboxylic acids. The pulverizability and storage stability of the binder resin for toner are superior when the content of the constitutional unit derived from isosorbide is equal to or more than the lower limit value. The durability of the binder resin for toner and the fixability of the toner are superior when the content of the constitutional unit derived from isosorbide is equal to or less than the upper limit value.

It is preferable that the polyester resin (A) contains either or both of a constitutional unit derived from a tri- or higher polycarboxylic acid and a constitutional unit derived from a trihydric or higher polyhydric alcohol. In this case, the content of the constitutional unit derived from a tri- or higher polycarboxylic acid and the constitutional unit derived from a trihydric or higher polyhydric alcohol (hereinafter collectively referred to as the "constitutional units derived from trivalent or higher monomers" in the polyester resin (A) is preferably in a range of from 0.1% to 80% by mole, more preferably from 1% to 60% by mole, and particularly preferably from 1% to 50% by mole with respect to the total number of moles (100% by mole) of the constitutional units derived from all the polycarboxylic acids. The anti-offset property on the high temperature side of the toner is superior when the content of the constitutional units derived from trivalent or higher monomers is equal to or more than the lower limit value. When the content of the constitutional units derived from trivalent or higher monomers is equal to or less than the upper limit value, the reaction at the time of resin polymerization is easily controlled, the producing stability of the resin is favorable, and the storage stability of the toner is favorable. In addition, the glossiness in the case of being used in a color toner is also favorable.

The content of the constitutional unit derived from a tri- or higher polycarboxylic acid in the polyester resin (A) is preferably 0.1% by mole or more, more preferably from 0.1% to 80% by mole, still more preferably from 1% to 60% by mole, and particularly preferably from 1% to 50% by mole with respect to the total number of moles (100% by mole) of the constitutional units derived from all the polycarboxylic acids. The anti-offset property on the high temperature side of the toner is superior when the content of the constitutional unit derived from a tri- or higher polycarboxylic acid is equal to or more than the lower limit value. When the content of the constitutional unit derived from a tri- or higher polycarboxylic acid is equal to or less than the upper limit value, the reaction at the time of resin polymerization is easily controlled, the producing stability of the resin is favorable, and the storage stability of the toner is favorable. In addition, the glossiness in the case of being used in a color toner is also favorable.

The content of the constitutional unit derived from a trihydric or higher polyhydric alcohol in the polyester resin (A) is preferably 0.1% by mole or more, more preferably from 0.1% to 80% by mole, still more preferably from 1% to 60% by mole, and particularly preferably from 1% to 50% by mole with respect to the total number of moles (100% by mole) of the constitutional units derived from all the polycarboxylic acids. The anti-offset property on the high temperature side of the toner is superior when the content of the constitutional unit derived from a trihydric or higher polyhydric alcohol is equal to or more than the lower limit value. When the content of the constitutional unit derived from a trihydric or higher polyhydric alcohol is equal to or less than the upper limit value, the reaction at the time of resin polymerization is easily controlled, the producing stability of the resin is favorable, and the storage stability of the toner is favorable. In addition, the glossiness in the case of being used in a color toner is also favorable.

The softening temperature of the polyester resin (A) is higher than 120° C. The toner exhibits excellent hot offset resistance when the softening temperature of the polyester resin (A) is higher than 120° C.

The softening temperature of the polyester resin (A) is preferably 122° C. or higher and still more preferably 125° C. or higher from the viewpoint of hot offset resistance of the toner.

In addition, the softening temperature of the polyester resin (A) is preferably 165° C. or lower, more preferably 160° C. or lower, and still more preferably 150° C. or lower from the viewpoint of low temperature fixability of the toner.

Hence, the softening temperature of the polyester resin (A) is preferably higher than 120° C. and 165° C. or lower, more preferably 122° C. or higher and 160° C. or lower, still more preferably 125° C. or higher and 160° C. or lower, and particularly preferably 125° C. or higher and 150° C. or lower.

The softening temperature of the polyester resin can be adjusted by the degree of polymerization, a composition of raw materials and the ratio thereof, and the like. For example, the softening temperature tends to increase as the degree of polymerization increases.

The glass transition temperature (Tg) of the polyester resin (A) is preferably from 40° C. to 85° C. and more preferably from 40° C. to 82° C. The storage stability of the toner is superior when the Tg is equal to or higher than the lower limit value of the above range, and the low temperature fixability of the toner is superior when the Tg is equal to or lower than the upper limit value of the above range.

The Tg of the polyester resin is measured by the method described in Examples to be described later. The Tg of the polyester resin can be adjusted by adjusting a composition of raw materials and the ratio thereof, the degree of polymerization, and the like. For example, the Tg tends to increase as the polyester resin (A) contains more constitutional units derived from isosorbide.

The acid value of the polyester resin (A) is preferably from 0.1 to 60 mg KOH/g and more preferably from 0.1 to 50 mg KOH/g. The productivity of the resin tends to be improved when the acid value of the polyester resin (A) is equal to or more than the lower limit value of the above range, and the polyester resin (A) becomes a resin exhibiting excellent resistance to moisture and the toner is hardly affected by the usage environment when the acid value is equal to or less than the upper limit value of the above range.

The acid value of the polyester resin is measured by the method described in Examples to be described later.

The weight average molecular weight (Mw) of the polyester resin (A) is preferably from 500 to 1,000,000 and more preferably from 500 to 800,000. The durability of the toner is superior when the Mw of the polyester resin (A) is equal to or more than the lower limit value of the above range, and the low temperature fixability of the toner is superior when the Mw is equal to or less than the upper limit value of the above range.

The number average molecular weight (Mn) of the polyester resin (A) is preferably from 500 to 100,000 and more preferably from 500 to 50,000.

The peak top molecular weight (Mp) of the polyester resin (A) is preferably from 500 to 100,000 and more preferably from 500 to 50,000.

The Mw, Mn, and Mp of the polyester resin are values in terms of standard polystyrene to be measured by gel permeation chromatography. For details, these are measured by the method described in Examples to be described later.

The polyester resin (A) has a gel fraction of preferably from 0.1% to 60% by mass and more preferably from 0.1% to 40% by mass. The hot offset resistance of the toner is superior when the gel fraction of the polyester resin (A) is equal to or more than the lower limit value of the above range, and the low temperature fixability of the toner is superior when the gel fraction is equal to or less than the upper limit value of the above range.

The gel fraction of the polyester resin is measured by the method described in Examples to be described later. The gel fraction of the polyester resin can be adjusted by a composition of raw materials and the ratio thereof, the degree of polymerization, control of the gelation reaction rate at the time of polycondensation polymerization, and the like. For example, the gel fraction tends to increase as the content of the constitutional unit derived from a trivalent or higher monomer increases.

The polyester resin (A) can be obtained by polycondensation of a monomer mixture containing a polycarboxylic acid and a polyhydric alcohol. The polyhydric alcohol includes at least a substance containing a constitutional unit derived from isosorbide and may include a polyhydric alcohol other than the substance containing a constitutional unit derived from isosorbide. The substance containing a constitutional unit derived from isosorbide is a divalent alcohol containing a structure to be represented by Formula 1, and examples thereof may include isosorbide and an alkylene oxide adduct of isosorbide. The monomer mixture may further contain a monohydric alcohol, a monocarboxylic acid, and the like if necessary.

[Chem. 1]

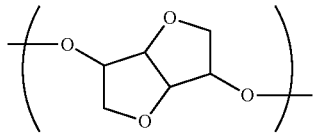

(Formula 1)

The content of each monomer in the monomer mixture is set depending on the content of the constitutional unit derived from each monomer in the polyester resin (A) and the like. The composition of the monomer mixture (the proportion of each monomer to the total amount of all the monomers) is almost equal to the composition of the polyester resin (the proportion of each constitutional unit to the total amount of all the constitutional units) to be obtained from this monomer mixture.

A polyester resin containing a constitutional unit derived from isosorbide at 0.1% by mole or more with respect to the total number of moles of the constitutional units derived from all the polycarboxylic acids, for example, when the proportion of the substance containing a constitutional unit derived from isosorbide to the total number of moles of the entire acid components in the monomer mixture is set to 0.1% by mole or more. A polyester resin having an isosorbide-derived carbon atom ratio of from 0.1% to 30% is obtained when the ratio of the number of carbon atoms contained in the substance containing a constitutional unit derived from isosorbide to the number of entire carbon atoms contained in the monomer mixture is set to from 0.1% to 30%.

The content (% by mold) of the trivalent or higher monomer component with respect to the total number of moles (100% by mole) of the entire acid components in the monomer mixture is almost equal to the content (% by mole) of the constitutional unit derived from a trivalent or higher monomer with respect to the total number of moles (100% by mole) of the constitutional units derived from all the polycarboxylic acids in the polyester resin to be obtained.

The "entire acid components" is the sum of all the polycarboxylic acids.

The polycondensation of the monomer mixture can be conducted by a known method, and it is not particularly limited. Examples of the method of polycondensation may include a method in which the monomer mixture is introduced into a reaction vessel and polymerized through an esterification reaction or a transesterification reaction and a polycondensation reaction.

The polymerization temperature is not particularly limited, but it is preferably set to be in a range of from 180° C. to 280° C. The productivity tends to be favorable in a case in which the polymerization temperature is 180° C. or higher, and the decomposition of the resin and the production of a by-product of volatile matter which causes odor tends to be suppressed in a case in which the polymerization temperature is 280° C. or lower. The lower limit value of the polymerization temperature is more preferably 200° or higher and particularly preferably 220° or higher. The upper limit value of the polymerization temperature is more preferably 270° or lower.

The polycondensation of the monomer mixture may be conducted in the presence of a polymerization catalyst.

Examples of the polymerization catalyst may include titanium tetraalkoxide, titanium oxide, dibutyltin oxide, tin acetate, zinc acetate, tin disulfide, antimony trioxide, germanium dioxide, magnesium acetate, and calcium acetate. Among these, titanium tetraalkoxide is preferable since it particularly has a great effect of accelerating the reaction rate.

The amount of the polymerization catalyst added at the time of polycondensation is preferably from 0 to 0.2 parts by mass with respect to 100 parts by mass of the entire raw materials.

The polycondensation of the monomer mixture may be conducted in the presence of a releasing agent. By conducting the polycondensation in the presence of a releasing agent, the fixability of the toner and the dispersibility in wax tend to be improved.

Examples of the releasing agent may include the same ones as those to be mentioned later as other components, and any one kind thereof may be used singly or two or more kinds thereof may be used in combination.

The amount of the releasing agent added at the time of polycondensation can be appropriately set to be in a range in which the effect of the invention is not impaired.

After the polymerization is completed, the contents are discharged from the apparatus in a bulk form and subjected to a pulverization step if necessary. The polyester resin (A) is thus obtained. The polyester resin (A) of the invention exhibits favorable pulverizability, and it can be thus efficiently pulverized until to have a fine particle diameter.

Examples of a method of judging whether or not the polyester resin (A) and the binder resin for toner and the toner which contain the polyester resin (A) are synthesized from isosorbide (compound derived from biomass) may include ASTM D6866 based on the principle of C14 (radioactive carbon) dating. Specifically, the concentration of the biomass ratio can be specified by a method in which the sample (resin) is dried to remove moisture and then weighed and $CO_2$ generated by burning the sample is adsorbed to an adsorbent via a chemical operation and subjected to the measurement using a liquid scintillation counter, a method in which $CO_2$ generated by burning the sample is formed into carbon graphite and subjected to the measurement using an accelerator mass spectrometer, a method in which benzene is synthesized from $CO_2$ generated by burning the sample and subjected to the measurement using a liquid scintillation counter, and the like.

<Polyester Resin (B)>

The polyester resin (B) is a polyester resin different from the polyester resin (A).

The polyester resin (B) is different from the polyester resin (A) typically in at least one of the softening temperature, the content of the constitutional unit derived from isosorbide, the content of the constitutional unit derived from a tri- or higher polycarboxylic acid and/or the content of the constitutional unit derived from a trihydric or higher polyhydric alcohol.

The polyester resin (B) contains a constitutional unit derived from a polycarboxylic acid and a constitutional unit derived from a polyhydric alcohol. The polyester resin (B) may further contain a constitutional unit derived from a monohydric alcohol, a constitutional unit derived from a monocarboxylic acid, and the like as long as the effect of the invention is not impaired.

Examples of the polycarboxylic acid, polyhydric alcohol, monohydric alcohol, and monocarboxylic acid may include the same ones as those mentioned for the polyester resin (A), respectively, and preferred aspects thereof are also the same. However, the polyester resin (B) may or may not contain a constitutional unit derived from isosorbide as the constitutional unit derived from a polyhydric alcohol.

The content of the constitutional unit derived from isosorbide in the polyester resin (B) is preferably in a range in which the isosorbide-derived carbon atom ratio, namely, the ratio of the number of carbon atoms contained in the constitutional unit derived from isosorbide to the number of entire carbon atoms contained in the polyester resin (B) is less than 1%. The isosorbide-derived carbon atom ratio in the polyester resin (B) is more preferably less than 0.3%, and it may be 0%. The durability of the toner is superior when the isosorbide-derived carbon atom ratio is equal to or less than the upper limit value.

Hence, it is preferable that the polyester resin (B) does not contain a constitutional unit derived from isosorbide or contains the constitutional unit derived from isosorbide in a range in which the isosorbide-derived carbon atom ratio is more than 0% and less than 1% (more preferably more than 0% and less than 0.3%).

The content of the constitutional unit derived from isosorbide in the polyester resin (B) is preferably less than 0.1% by mole with respect to the total number of moles of the constitutional units derived from all the polycarboxylic acids, and it may be 0% by mole. In other words, it is preferable that the polyester resin (B) does not contain a constitutional unit derived from isosorbide or contains the constitutional unit derived from isosorbide at more than 0% by mole and less than 0.1% by mole with respect to the total number of moles of the constitutional units derived from all the polycarboxylic acids. This makes it possible to suppress deterioration in durability of the toner.

In a case in which the polyester resin (B) contains either or both of constitutional units derived from trivalent or higher monomers, namely, a constitutional unit derived from a tri- or higher polycarboxylic acid and a constitutional unit derived from a trihydric or higher polyhydric alcohol, the content of the constitutional units derived from trivalent or higher monomers in the polyester resin (B) is preferably in a range of from 0.1% to 80% by mole, more preferably from 1% to 45% by mole, and particularly preferably from 1% to 40% by mole with respect to the total number of moles (100% by mole) of the constitutional units derived from all the polycarboxylic acids. The anti-offset property on the high temperature side of the toner is superior when the content of the constitutional units derived from trivalent or higher monomers is equal to or more than the lower limit value. When the content of the constitutional units derived from trivalent or higher monomers is equal to or less than the upper limit value, the reaction at the time of resin polymerization is easily controlled, the producing stability of the resin is favorable, and the storage stability of the toner is favorable. In addition, the glossiness in the case of being used in a color toner is also favorable.

The content of the constitutional unit derived from a tri- or higher polycarboxylic acid in the polyester resin (B) is preferably 0.1% by mole or more, more preferably from 0.1% to 80% by mole, still more preferably from 1% to 45% by mole, and particularly preferably from 1% to 40% by mole with respect to the total number of moles (100% by mole) of the constitutional units derived from all the polycarboxylic acids. The anti-offset property on the high temperature side of the toner is superior when the content of the constitutional unit derived from a tri- or higher polycarboxylic acid is equal to or more than the lower limit value. When the content of the constitutional unit derived from a tri- or higher polycarboxylic acid is equal to or less than the upper limit value, the reaction at the time of resin polymerization is easily controlled, the producing stability of the resin is favorable, and the storage stability of the toner is favorable. In addition, the glossiness in the case of being used in a color toner is also favorable.

The content of the constitutional unit derived from a trihydric or higher polyhydric alcohol in the polyester resin (B) is preferably 0.1% by mole or more, more preferably from 0.1% to 80% by mole, still more preferably from 1% to 45% by mole, and particularly preferably from 1% to 40% by mole with respect to the total number of moles (100% by mole) of the constitutional units derived from all the polycarboxylic acids. The anti-offset property on the high temperature side of the toner is superior when the content of the constitutional unit derived from a trihydric or higher polyhydric alcohol is equal to or more than the lower limit value. When the content of the constitutional unit derived from a trihydric or higher polyhydric alcohol is equal to or less than the upper limit value, the reaction at the time of resin polymerization is easily controlled, the producing stability of the resin is favorable, and the storage stability of the toner is favorable. In addition, the glossiness in the case of being used in a color toner is also favorable.

From the viewpoint of the molecular weight distribution width which contributes to both the low temperature fixability and non-offset property (particularly hot offset resistance), it is preferable that the polyester resin (A) and the polyester resin (B) have different contents of a constitutional unit derived from a tri-t or higher polycarboxylic acid and/or a constitutional unit derived from a trihydric or higher polyhydric alcohol.

The softening temperature of the polyester resin (B) is not particularly limited, and it may be higher than 120° C. or 120° C. or lower.

The softening temperature of the polyester resin (B) is preferably 165° C. or lower, more preferably 160° C. or lower, and still more preferably 150° C. or lower from the viewpoint of low temperature fixability of the toner.

The softening temperature of the polyester resin (B) is preferably 75° C. or higher and more preferably 80° C. or higher from the viewpoint of storage stability.

It is preferable that the polyester resin (A) and the polyester resin (B) have different softening temperatures from the viewpoint of separation of functions in toner properties.

In a preferred aspect of the invention, the softening temperature of the polyester resin (B) is higher than 120° C. and preferably 122° C. or higher. The durability and hot offset resistance of the toner are particularly excellent when the softening temperature of the polyester resin (B) is equal to or higher than the lower limit value.

The upper limit of the softening temperature of the polyester resin (B) in the present aspect is not particularly limited, but it is preferably 165° C., more preferably 160° C., and still more preferably 150° C. from the viewpoint of low temperature fixability of the toner.

Hence, the softening temperature of the polyester resin (B) in the present aspect is preferably higher than 120° C. and 165° C. or lower, more preferably 122° C. or higher and 160° C. or lower, and still more preferably 125° C. or higher and 160° C. or lower.

It is preferable that the softening temperature of the polyester resin (B) is different from the softening temperature of the polyester resin (A) as described above.

In another preferred aspect of the invention, the softening temperature of the polyester resin (B) is 120° C. or lower, preferably 110° C. or lower, and more preferably 100° C. or lower. The low temperature fixability of the toner is particularly excellent when the softening temperature of the polyester resin (B) is equal to or lower than the upper limit value.

The lower limit of the softening temperature of the polyester resin (B) in the present aspect is not particularly limited, but it is preferably 75° C. and more preferably 80° C. from the viewpoint of storage stability of the toner.

Hence, the softening temperature of the polyester resin (B) in the present aspect is preferably from 75° C. to 120° C. and more preferably from 80° C. to 110° C.

The glass transition temperature (Tg) of the polyester resin (B) is preferably from 35° C. to 85° C. and more preferably from 35° C. to 82° C. The storage stability of the toner is superior when the Tg is equal to or higher than the lower limit value of the above range, and the low temperature fixability of the toner is superior when the Tg is equal to or lower than the upper limit value of the above range.

The acid value of the polyester resin (B) is preferably from 0.1 to 60 mg KOH/g and more preferably from 0.1 to 50 mg KOH/g. The reactivity of the resin tends to be improved when the acid value of the polyester resin (B) is equal to or more than the lower limit value of the above range, and the resistance to moisture is superior when the acid value is equal to or less than the upper limit value of the above range.

The weight average molecular weight (Mw) of the polyester resin (B) is preferably from 500 to 1,000,000 and more preferably from 700 to 700,000. The durability is superior when the Mw of the polyester resin (B) is equal to or more than the lower limit value of the above range, and the pulverizability of binder resin for toner is superior when the Mw is equal to or less than the upper limit value of the above range.

The number average molecular weight (Mn) of the polyester resin (B) is preferably from 500 to 100,000 and more preferably from 500 to 50,000.

The peak top molecular weight (Mp) of the polyester resin (B) is preferably from 500 to 100,000 and more preferably from 500 to 50,000.

The gel fraction of the polyester resin (B) is preferably from 0% to 60% by mass and more preferably from 0% to 40% by mass.

The polyester resin (B) can be produced by the same method as in the polyester resin (A).

<Another Binder Resin>

Examples of a binder resin other than the polyester resin (A) and the polyester resin (B) may include polyester resins other than the polyester resin (A) and the polyester resin (B), a cyclic olefin resin, a styrene-based resin, a styrene-acrylic resin, an acrylic resin, and an epoxy resin. Any one kind of these may be used singly or two or more kinds thereof may be used in mixture. By concurrently using these resins and the polyester resin, there is a tendency that the fixability can be improved.

<Content of Each Component>

In the binder resin for toner of the invention, the mass ratio (polyester resin (A):polyester resin (B)) of the polyester resin (A) to the polyester resin (B) is preferably from 5:95 to 95:5, more preferably from 10:90 to 90:10, still more preferably from 25:75 to 75:25, and particularly preferably from 40:60 to 60:40.

The pulverizability of the binder resin for toner tends to be more favorable in a case in which the ratio of the polyester resin (A) is 5% by mass or more with respect to the sum of the polyester resin (A) and the polyester resin (B).

When the ratio of the polyester resin (B) is 5% by mass or more with respect to the sum of the polyester resin (A) and the polyester resin (B), the durability of the toner tends to be more favorable in a case in which the softening temperature of the polyester resin (B) is higher than 120° C. and the low temperature fixability of the toner tends to be more favorable in a case in which the softening temperature of the polyester resin (B) is 120° C. or lower.

The content of another binder resin is preferably 30 parts by mass or less, more preferably 25 parts by mass or less, and particularly preferably 20 parts by mass or less with respect to 100 parts by mass of the sum of the polyester resin (A) and the polyester resin (B). The effect by the polyester resin (A) and the polyester resin (B) is sufficiently exerted when the content of the other binder resin is equal to or less than the upper limit value.

<Pulverizability Index>

The pulverizability index of the binder resin for toner of the invention is 25 or more, preferably 30 or more, and particularly preferably 40 or more. The pulverizability of the binder resin for toner is excellent when the pulverizability index is equal to or more than the lower limit value.

It is more preferable as the pulverizability index of the binder resin for toner is higher from the viewpoint of pulverizability, and the upper limit thereof is not particularly limited. The pulverizability index is preferably 90 or less from the viewpoint of durability of the toner.

In the invention, the pulverizability index is a value determined by the following measurement method.

(Method of Measuring Pulverizability Index)

The binder resin for toner is melted and kneaded by a twin screw extruder at a set temperature of 120° C. to obtain a kneaded product, and the kneaded product is pulverized to obtain a pulverized product I. Subsequently, the pulverized product I is sieved, and the particles which pass through a sieve with 16 mesh (mesh opening: 1.0 mm) but do not pass through a sieve with 22 mesh (mesh opening: 0.71 mm) are collected. A predetermined amount (G (g)) of these particles is pulverized for 10 minutes by setting the scale at 3 and using a pulverizer Trio Blender (manufactured by Trio Science Co.) to obtain a pulverized product II. Subsequently, the pulverized product II is sieved, and the mass (H (g)) of the particles which pass through a sieve with 30 mesh (mesh opening: 0.5 mm) is measured, and the passage rate (%) is calculated by the following equation. This operation is conducted three times, and the average value of passage rates (%) thus determined is taken as the pulverizability index.

Passage rate (%)=$(H/G) \times 100$

The pulverizability index of the binder resin for toner can be adjusted by the content of the constitutional unit derived from isosorbide (isosorbide-derived carbon atom ratio) in the polyester resin (A), the amount of the constitutional unit derived from trivalent or higher monomers, the mass ratio of the polyester resin (A) to the polyester resin (B), the molecular weight of the polyester resin (B) to be combined, the content of the constitutional unit derived from trivalent or higher monomers, and the like. For example, the pulverizability index tends to increase as the isosorbide-derived carbon atom ratio in the polyester resin (A) is higher or the molecular weight of the polyester resin (B) to be combined is smaller.

<Effect of Binder Resin for Toner>

The binder resin for toner of the invention described above exhibits favorable pulverizability in the case of producing a toner through a pulverization step. For example, when a mixture containing the polyester resin (A) and the polyester resin (B) is melted and kneaded and the kneaded product thus obtained is pulverized, a finer pulverized product tends to be obtained as compared to a case in which the polyester resin (A) does not contain a constitutional unit derived from isosorbide. Hence, it is possible to decrease the pulverization energy required for fine grinding when a toner is produced by the pulverization method. In addition, it is possible to decrease the time required for dissolution of the binder resin and the like to be dissolved in a solvent by pulverizing and finely grinding them in advance in the case of producing a toner by the chemical method as well. The productivity of toner is thus improved.

From the viewpoint of exhibiting the effect described above, a method including a step of melting and kneading a mixture containing the polyester resin (A) and the polyester resin (B) and pulverizing the kneaded product thus obtained is suitable as the method for producing a toner using the binder resin for toner of the invention.

In addition, the toner obtained by using the binder resin for toner of the invention exhibits excellent durability, and it is thus possible to suppress dirt on the apparatus at the time of continuous printing, fogging of the printed surface, and the like. According to the binder resin for toner of the invention, it is possible to make the toner excellent in all the storage stability, low temperature fixability, non-offset property, and durability.

<<Toner>>

The toner of the invention contains the binder resin for toner of the invention described above.

The toner of the invention may further contain components other than the binder resin, if necessary.

<Other Components>

Examples of components other than the binder resin may include a coloring agent, a charge control agent, a releasing agent, additives other than these, and a magnetic material.

The coloring agent is not particularly limited, but examples thereof may include carbon black, nigrosine, aniline blue, phthalocyanine blue, phthalocyanine green, Hansa yellow, rhodamine-based dyes and pigments, chrome yellow, quinacridone, benzidine yellow, rose bengal, triallyl methane-based dyes, and monoazo-based, disazo-based, condensed azo-based dyes or pigments. These coloring agents may be used singly or two or more kinds thereof may be used in mixture. In the case of a full color toner, it is possible to use benzidine yellow, monoazo-based dyes and pigments, condensed azo-based dyes and pigments, and the like as yellow, quinacridone, rhodamine-based dyes and pigments, monoazo-based dyes and pigments, and the like as magenta, and phthalocyanine blue and the like as cyan.

The charge control agent is not particularly limited, but examples thereof may include a positive charge control agent such as a quaternary ammonium salt, a basic or electron-donating organic substance; and a negative charge control agent such as a metal chelate, a metal-containing dye, and an acidic or electron-withdrawing organic substance. In the case of a color toner, the charge control agent is preferably colorless or exhibits a light color from the viewpoint of not disturbing the color tone of the toner, and examples of such a charge control agent may include a metal salt of salicylic acid or alkylsalicylic acid with chromium, zinc, aluminum, or the like, a metal complex, an amide compound, a phenol compound, and a naphthol compound thereof. Furthermore, a vinyl polymer having a styrene-based, acrylic acid-based, methacrylic acid-based, or a sulfonic acid group may be used as a charge control agent.

The releasing agent is not particularly limited and can be appropriately selected from known releasing agents in consideration of the releasability, storage stability, fixability, coloring property, and the like of the toner and used. Examples of the releasing agent may include carnauba wax, rice wax, beeswax, polypropylene-based wax, polyethylene-based wax, synthetic ester-based wax, paraffin wax, fatty acid amide, and silicone-based wax. Any one kind of these may be used singly or two or more kinds thereof may be used in combination.

The melting point of the releasing agent is not particularly limited and can be appropriately selected in consideration of the performance of toner described above and used.

The other additives are not particularly limited, but examples thereof may include a fluidity improver (fluidity modifier) such as fine powder silica, alumina, or titania; an inorganic fine powder such as magnetite, ferrite, cerium oxide, strontium titanate, or conductive titania; a resistance regulator such as a styrene resin or an acrylic resin; and a lubricant. These may be contained as internal additives or external additives.

The toner of the invention can be used as any developer of a magnetic one-component developer, a nonmagnetic one-component developer, or a two-component developer.

It is preferable that the toner of the invention contains a magnetic material in the case of being used as a magnetic one-component developer.

Examples of the magnetic material may include ferromagnetic alloys containing iron, cobalt, nickel, and the like such as ferrite and magnetite. In addition to these, examples thereof may also include alloys which do not contain compounds or ferromagnetic elements but exhibit ferromagnetism by a proper heat treatment, for example, a so-called Heusler alloy containing manganese and copper such as manganese-copper-aluminum or manganese-copper-tin, and chromium dioxide.

<Content of Each Component>

In the toner of the invention, the content of the binder resin for toner of the invention is preferably an amount so that the total amount of the polyester resin (A) and the polyester resin (B) is 20% by mass or more with respect to the entire amount (100% by mass) of the toner. The total amount of the polyester resin (A) and the polyester resin (B) is more preferably 22% by mass or more and still more preferably 25% by mass or more. When the total amount of the polyester resin (A) and the polyester resin (B) is equal to or more than the lower limit value, the pulverizability, storage stability, low temperature fixability, non-offset property, and durability of the toner are superior as well as the effect as a binder resin for fixing the toner on paper is sufficiently exerted.

The upper limit of the content of the binder resin for toner of the invention with respect to the entire amount of the toner can be appropriately set depending on the content of other components to be arbitrarily contained, and it is typically 95% by mass although it is not particularly limited.

In a case in which the toner of the invention contains a coloring agent, the content of the coloring agent is not particularly limited, but it is preferably from 2% to 10% by mass with respect to the entire amount of the toner from the viewpoint of color tone of the toner, image density, and thermal properties.

In a case in which the toner of the invention contains a charge control agent, the content of the charge control agent is not particularly limited, but it is preferably from 0.5% to 5% by mass with respect to the entire amount of the toner. The electric charge amount of the toner tends to be at a sufficient level in a case in which the content of the charge control agent is 0.5% by mass or more, and a decrease in the electric charge amount due to aggregation of the charge control agent tends to be suppressed in a case in which the content is 5% by mass or less.

In a case in which the toner of the invention contains a releasing agent, the content of the releasing agent is not particularly limited, but it is preferably from 0.3% to 15% by mass with respect to the entire amount of the toner from the viewpoint of the performance of toner described above. The lower limit of the content of the releasing agent is more preferably 1% by mass and particularly preferably 2% by mass. In addition, the upper limit of the content of the releasing agent is more preferably 13% by mass and particularly preferably 12% by mass. Hence, the content of the releasing agent is more preferably from 1% to 13% by mass and particularly preferably from 2% to 12% by mass with respect to the entire amount of the toner.

In a case in which the toner of the invention contains other additives, the content of the other additives is not particularly limited, but it is preferably from 0.05% to 10% by mass with respect to the entire amount of the toner. The effect of modifying the performance of toner tends to be sufficiently obtained in a case in which the content of other additives is 0.05% by mass or more, and the image stability by the toner tends to be favorable in a case in which the content is 10% by mass or less.

In a case in which the toner of the invention contains a magnetic material, the content of the magnetic material is not particularly limited, but it is preferably from 3% to 70% by mass with respect to the entire amount of the toner since the magnetic material greatly affects the pulverizability. The electric charge amount of the toner tends to be at a sufficient level in a case in which the content of the magnetic material is 3% by mass or more, and the fixability and pulverizability of the toner tend to be favorable in a case in which the content is 70% by mass or less. The upper limit of the content of the magnetic material is more preferably 60% by mass and particularly preferably 50% by mass. Hence, the content of the magnetic material is more preferably from 3% to 60% by mass and particularly preferably from 3% to 50% by mass with respect to the entire amount of the toner.

The average particle diameter of the toner of the invention is not particularly limited, but it is preferably from 1 to 10 μm and more preferably from 3 to 8 μm. The productivity of the toner is excellent when the average particle diameter is equal to or greater than the lower limit value of the above range, and high image quality is achieved when the average particle diameter is equal to or smaller than the upper limit value. Incidentally, in the present specification, the average particle diameter is a value measured by the measurement method to be described later.

<Method for Producing Toner>

The method for producing the toner of the invention is not particularly limited, and a known method such as a pulverization method or a chemical method can be utilized.

As the method for producing a toner of the invention, a method including a step of melting and kneading a mixture containing the polyester resin (A) and the polyester resin (B) and pulverizing the kneaded product thus obtained is preferable as described above.

Examples of the method for producing the toner of the invention by a pulverization method may include a producing method including a step of melting and kneading a mixture containing the polyester resin (A) and the polyester resin (B) and pulverizing the kneaded product (toner lump) thus obtained.

The mixture may contain another binder resin, a coloring agent, a charge control agent, a releasing agent, other additives, a magnetic material, and the like. The melting and kneading can be conducted by using a known kneading machine such as a twin screw extruder. The melting and kneading is typically conducted under the conditions having a set temperature of from 100° C. to 200° C. The kneaded product can be pulverized by using a known pulverizer such as a jet mill. The pulverization may be stepwisely conducted such that coarse pulverization is followed by fine pulverization, or the pulverization may be conducted by one step. After pulverization, the pulverized product thus obtained may be classified. After pulverization or classification, the product may be subjected to an external addition treatment by inorganic particles and the like if necessary. The toner of the invention is thus obtained.

Examples of the method for producing the toner of the invention by a chemical method may include a method in which the polyester resin (A), the polyester resin (B), and if necessary, another binder resin, a coloring agent, a charge control agent, a releasing agent, other additives, a magnetic material, and the like are dissolved or dispersed in a solvent, granulation is conducted in an aqueous medium, the solvent is then removed from the resultant, the residue is washed and dried to obtain toner particles, and if necessary, the toner particles are subjected to an external addition treatment by inorganic particles and the like to obtain a toner and a method in which the polyester resin (A) and the polyester resin (B) are dissolved in a solvent and neutralized, the solution is then finely dispersed in water and subjected to desolvation to obtain a water type emulsion, an aqueous fine dispersion of another binder resin, a coloring agent, a charge control agent, a releasing agent, and other additives is prepared if necessary, the water type emulsion is mixed with this aqueous fine dispersion, the mixture is subjected to aggregation, coalescence, dehydration, washing, and drying to obtain toner particles, and if necessary, the toner particles are subjected to an external addition treatment by inorganic particles to obtain a toner.

Examples of the solvent may include tetrahydrofuran, ethyl acetate, methyl ethyl ketone, and isopropyl alcohol. Examples of the aqueous medium may include water.

A step of melting and kneading a mixture containing the polyester resin (A) and the polyester resin (B) and pulverizing the kneaded product thus obtained may be conducted before dissolving or dispersing the mixture in a solvent. Alternatively, a step of separately melting and kneading the polyester resin (A) and the polyester resin (B), then mixing the respective kneaded products thus obtained together, and pulverizing the mixture thus obtained may be conducted before dissolving or dispersing the mixture in a solvent.

<Effect of Toner>

The toner of the invention described above contains the binder resin for toner of the invention, and it thus exhibits excellent storage stability, low temperature fixability, non-offset property, and durability as described above. In addition, pulverizability of the kneaded product is favorable in the case of producing a toner through a step of melting and kneading the polyester resin (A), the polyester resin (B), and the like and pulverizing the kneaded product thus obtained. Hence, the productivity is excellent.

<Application>

The toner of the invention is suitably used in development of an electrostatic image or a magnetic latent image in an electrophotographic method, an electrostatic recording method, an electrostatic printing method, or the like.

The toner of the invention can be used as any developer of a magnetic one-component developer, a nonmagnetic one-component developer, or a two-component developer. The toner of the invention can be used as a magnetic one-component developer as it is when the toner of the invention contains a magnetic material. The toner of the invention can be used as a nonmagnetic one-component developer as it is when the toner of the invention does not contain a magnetic material. In addition, the toner of the invention can be used as a two-component developer when a toner which does not contain a magnetic material as the toner of the invention and a carrier are used concurrently.

As the carrier, it is possible to use known carriers such as magnetic substances such as an iron powder, a magnetite powder, and a ferrite powder, those obtained by coating the surface thereof with a resin, and a magnetic carrier. As the coating resin for the resin-coated carrier, it is possible to use a styrene-based resin, an acrylic resin, a styrene acrylic copolymer-based resin, a silicone-based resin, a modified silicone-based resin, and a fluorine-based resin which are generally known, and any mixture of these resins.

EXAMPLES

Hereinafter, the invention will be described in more detail with reference to Examples, but the invention is not limited by the following Examples.

The evaluation methods used in each example to be described later are as follows.

<Method of Evaluating Physical Properties of Polyester Resin>

(Glass Transition Temperature (Tg))

The temperature at the intersection point between the baseline on the low temperature side of the chart when a polyester resin was filled in an aluminum cell by 10±0.5 mg and heated on a hot plate at 100° C. for 10 minutes, the cell was brought into close contact with dry ice and rapidly cooled to 0° C. or lower, and the measurement was then conducted at a rate of temperature increase of 5° C./min by using a differential scanning calorimeter DSC-60 manufactured by Shimadzu Corporation and the tangent of the endothermic curve in the vicinity of the glass transition temperature was determined and the temperature was taken as Tg.

(Softening Temperature)

The measurement is conducted by using a polyester resin as a measurement sample at a load of 294 N (30 kgf) while constantly increasing the temperature at a rate of temperature increase of 3° C./min by using a nozzle of 1 mm ϕ×10 mm and a flow tester CFT-500 manufactured by Shimadzu Corporation. The measurement sample is prepared by 1.0 g. The temperature at which the measurement sample was discharged by 4 mm from the baseline was determined, and the temperature was taken as the softening temperature.

(Acid Value)

A polyester resin was precisely weighed (A (g)) by about 0.2 g and introduced into a side-arm Erlenmeyer flask, 20 mL of benzyl alcohol was added thereto, and the polyester resin was heated by using a heater at 230° C. for 15 minutes in a nitrogen atmosphere to be dissolved. The solution was cooled to room temperature, 20 mL of chloroform and a few drops of a phenolphthalein solution were then added thereto, and the titration was conducted with a 0.02 normal KOH benzyl alcohol solution (titre=B (mL), potency of KOH solution=p). The blank measurement was conducted in the same manner (titre=C (mL)), and the acid value of the polyester resin was calculated according to the following equation.

Acid value (mg KOH/g)=$(B-C) \times 0.02 \times 56.11 \times p \div A$ (Average Molecular Weight)

An elution curve was obtained by gel permeation chromatography under the following conditions, and the average molecular weight (Mw, Mn, and Mp) and the molecular weight dispersity (Mw/Mn) were determined in terms of standard polystyrene from the retention time corresponding to the peak value on the elution curve thus obtained.

Apparatus: HLC 8020 manufactured by TOSOH CORPORATION.

Column: three columns of TSKgel (registered trademark) GMHXL (column size: 7.8 mm (inner diameter)×30.0 cm (length)) manufactured by TOSOH CORPORATION connected in series.

Oven temperature: 40° C.

Eluent: tetrahydrofuran (THF).

Sample concentration: 4 mg/10 mL.

Filtration conditions: sample solution is filtered through 0.45 μm Teflon (registered trademark) membrane filter.

Flow velocity: 1 mL/min.

Injection volume: 0.1 mL.

Detector: differential refractive index (RI) detector.

(Gel Fraction)

A polyester resin was weighed (D (g)) by about 0.5 g and introduced into a 100 mL Erlenmeyer flask, 50 mL of THF was added thereto, the polyester resin was dissolved by immersing the flask in a water bath set at 70° C. for 3 hours, thereby preparing a THF solution. Meanwhile, Celite 545 was tightly filled in a glass filter 1GP100 up to 6 to 7 portions, dried in a dryer at 105° C. for 3 hours or longer, and weighed (E (g)).

Subsequently, the THF solution in which the polyester resin was dissolved was transferred into this dried glass filter and subjected to suction filtration. All the contents remaining on the wall of the Erlenmeyer flask were transferred into the glass filter by using acetone, acetone was allowed to flow in the glass filter to drop the soluble matter into the suction bottle, suction was continuously conducted so that the solvent did not remain in the filter, and the residue was then dried in a vacuum dryer at 80° C. for 3 hours or longer and weighed (F (g)). The THF-insoluble matter (% by mass) was calculated by the following equation, and this value was taken as the gel fraction.

THF-insoluble matter (% by mass)=$(F-E)/D \times 100$

<Pulverizability Index of Binder Resin for Toner>

A kneaded product of a binder resin was obtained in the same manner as in the production of a toner in Examples and Comparative Examples to be described later except that components other than the polyester resin (binder resin) were not blended, the kneaded product thus obtained was pulverized and sieved, and the particles which passed through 16 mesh but did not pass through 22 mesh were obtained. This classified powder was precisely weighed by 10.00 g (G (g)), pulverized for 10 minutes by using a pulverizer Trio Blender (manufactured by Trio Science Co.), and then sieved through a sieve with 30 mesh. The mass (H (g)) of the particles which passed through a sieve with 30 mesh (mesh opening: 0.5 mm) was precisely weighed, and the passage rate (%) was calculated by the following equation. This operation was conducted three times, and the average value thereof was taken as the pulverizability index of the binder resin for toner in each example.

Passage rate (%)=$(H/G) \times 100$ (Particle Diameter and Particle Size Distribution of Particles)

The particle diameter and particle size distribution of the particles were measured by using a laser diffraction type particle diameter measuring instrument (trade name: "LA-920", manufactured by HORIBA, Ltd.). According to the operation manual of the measuring instrument, a flow cell for measurement was used, distilled water was added into the cell, the relative refractive index was selected and set to 1.20, and the adjustment of the optical axis, fine adjustment of the optical axis, and blank measurement were conducted by setting the particle diameter standard to a volume standard. Next, an aqueous dispersion of particles was added into the cell so as to have a concentration at which the transmittance was in a range of from 70% to 90%, an ultrasonic treatment was conducted for 1 minute at an intensity of 5, and the particle size distribution of the particles was measured. The particle diameter (median diameter) corresponding to a cumulative percentage of 50% on the volume distribution standard in the particle size distribution thus measured was taken as the average particle diameter.

<Method of Evaluating Toner>

(Storage Stability)

A toner was weighed by about 5 g and introduced into a sample bottle, this was left to stand for about 24 hours in a dryer maintained at 45° C., and the degree of aggregation of the toner was evaluated and used as an index of storage stability (blocking resistance). The evaluation criteria were as follows.

⊙ (Significantly favorable): toner is dispersed by only turning sample bottle upside down.

○ (Favorable): toner is dispersed by turning sample bottle upside down and tapping it 2 or 3 times.

Δ (Usable): toner is dispersed by turning sample bottle upside down and tapping it 4 or 5 times.

x (Inferior): toner is not dispersed by turning sample bottle upside down and tapping it 5 times.

(Low Temperature Fixability)

Printing was conducted by using a printer (SPEEDIA (registered trademark) N4-614 manufactured by CASIO COMPUTER CO., LTD.) which had a fixing roller not coated with silicone oil, was set to have a roller speed of 100 mm/sec, and was capable of changing the temperature, and the low temperature fixability was evaluated. Specifically, the final temperature at which the toner started to be fixed on the paper when the toner was fixed on paper was taken as the fixing temperature, and the low temperature fixability was judged according to the following criteria.

⊙ (Significantly favorable): fixing temperature is lower than 140° C.

○ (Favorable): fixing temperature is 140° C. or higher and lower than 150° C.

Δ (Usable): fixing temperature is 150° C. or higher and lower than 160° C.

x (Inferior): fixing temperature is 160° C. or higher.

(Hot Offset Resistance)

By using a printer which had a fixing roller not coated with silicone oil, was set to have a roller speed of 30 mm/sec, and was capable of changing the roller temperature, a solid image of 4.5 cm in length×15 cm in width was printed as a test pattern at a toner density of 0.5 mg/cm$^2$ and a roller temperature of every 5° C. At this time, the lowest temperature at which the toner was transferred to the fixing roller by the hot offset phenomenon at the time of fixing was determined as the hot offset occurring temperature, and the hot offset resistance (non-offset property) was judged according to the following criteria.

⊙ (Significantly favorable): hot offset occurring temperature is 200° C. or higher.

○ (Favorable): hot offset occurring temperature is 180° C. or higher and lower than 200° C.

Δ (Usable): hot offset occurring temperature is 170° C. or higher and lower than 180° C.

x (Inferior): hot offset occurring temperature is lower than 170° C.

(Durability)

After 30,000 sheets of test pattern were printed by the same method as in the evaluation of hot offset resistance, the durability was evaluated by adhesion to the blade and fogging of the printed surface according to the following criteria.

⊙ (Significantly favorable): adhesion to blade and fogging are not observed.

○ (Favorable): adhesion to blade and fogging are significantly slightly observed.

Δ (Usable): adhesion to blade and fogging are slightly observed but can be improved by additives and the like.

x (Inferior): adhesion to blade and fogging are greatly observed.

Production Examples 1 to 9: Production of Polyester Resin

The polycarboxylic acids and polyhydric alcohols presented in Table 1 and titanium alkoxide to be 500 ppm with respect to the entire acid components were introduced into a reaction vessel equipped with a distillation column.

Subsequently, the number of revolutions of the stirring blade in the reaction vessel was maintained at 120 rpm, the temperature was started to increase, heating was conducted so that the temperature in the reaction system reached 265° C., and the esterification reaction was conducted while maintaining this temperature. After the esterification reaction was completed and discharge of water from the reaction system was not observed any longer, the temperature in the reaction system was lowered and maintained at 245° C., the pressure in the reaction vessel was lowered over about 40 minutes, the degree of vacuum was set to 133 Pa, and the condensation reaction was conducted while discharging the diol component from the reaction system.

The viscosity of the reaction system increased as the reaction proceeded, the degree of vacuum was increased as the viscosity increased, and the condensation reaction was conducted until the torque of the stirring blade reached a value indicating the desired softening temperature. Thereafter, the stirring was stopped at the time point at which the predetermined torque was indicated, the reaction system was returned to normal pressure, and the reaction product was taken out from the reaction vessel by pressurizing with nitrogen, thereby obtaining polyester resins A to I. The physical properties of the polyester resins A to I thus obtained are presented in Table 1.

Incidentally, the composition of the polycarboxylic acids and polyhydric alcohols introduced presented in Table 1 is parts by mole of each monomer component when the total number of moles of the entire acid components (all the polycarboxylic acids) is taken as 100 parts by mole.

As the "bisphenol A PO adduct", polyoxypropylene(2.3)-2,2-bis(4-hydroxyphenyl)propane was used.

The isosorbide-derived carbon atom ratio is the ratio (%) of the number of carbon atoms contained in the constitutional unit derived from isosorbide to the number of entire carbon atoms contained in the polyester resin.

The isosorbide-derived carbon atom ratio and the content of the trivalent or higher monomer component with respect to the total number of moles of the entire acid components were respectively calculated from the composition introduced.

Example 1

A mixture was obtained by mixing 89 parts by mass of a polyester resin, 7 parts by mass of a quinacridone pigment (HOSTAPARM PINK E, C.I. No. Pigment Red 122 manufactured by Clariant), 3 parts by mass of carnauba wax No. 1 (manufactured by TOYO ADL CORPORATION), and 1 part by mass of a negatively chargeable charge control agent (LR-147 manufactured by Japan Carlit Co., Ltd.) by using a Henschel mixer for 5 minutes. As the polyester resin, the polyester resin A and polyester resin F produced above were used in a mass ratio of A:F=50:50. In other words, the ratio of the polyester resin A to the total mass of the binder resin for toner was set to 50% by mass, and the ratio of the polyester resin F to 50% by mass.

Subsequently, the mixture thus obtained was melted and kneaded by using a twin screw extruder (PCM-29, manufactured by Ikegai Corp.). The melting and kneading was conducted by setting the external temperature of the barrel 1 to 30° C., the barrel 2 to 60° C., the barrel 3 to 100° C., and the barrel 4 onwards to 120° C. After kneading, the resultant was cooled, thereby obtaining a toner lump. The toner lump thus obtained was finely pulverized to have a particle diameter of 10 μm or less by using a jet mill of a fine pulverizer, thereby obtaining a pulverized product. The pulverized product thus obtained was arranged to have an average particle diameter of 4 μm or more and 9 μm or less by excluding fine particles having a particle diameter of 3 μm or less by using a classifier. To 100 parts by mass of the fine powder thus obtained, 0.25 part by mass of silica (R-972 manufactured by EVONIK) was added and attached by mixing them together by using a Henschel mixer, thereby obtaining a toner.

The toner thus obtained was evaluated by the evaluation methods described above. The results are presented in Table 2.

Examples 2 to 6 and Comparative Examples 1 to 4

Toners were obtained by the same method as in Example 1 except that the composition (the kind of the polyester resin and the ratio (% by mass) thereof to the total mass) of the binder resin for toner was changed as presented in Tables 2 and 3.

TABLE 1

| | | | Production Example 1 | Production Example 2 | Production Example 3 | Production Example 4 | Production Example 5 | Production Example 6 | Production Example 7 | Production Example 8 | Production Example 9 |
|---|---|---|---|---|---|---|---|---|---|---|---|
| | Polyester resin | | A | B | C | D | E | F | G | H | I |
| Composition introduced | Terephthalic acid | Parts by mole | 98 | 100 | 70 | 94 | 94 | 70 | 100 | 94 | 100 |
| | Anhydrous trimellitic acid | Parts by mole | 2 | 0 | 30 | 6 | 6 | 30 | 0 | 6 | 0 |
| | Bisphenol A PO adduct | Parts by mole | 45 | 45 | 95 | 118 | 65 | 95 | 50 | 65 | 90 |
| | Ethylene glycol | Parts by mole | 20 | 18 | 40 | 0 | 55 | 60 | 63 | 55 | 28 |
| | Trimethylolpropane | Parts by mole | 0 | 10 | 0 | 0 | 0 | 0 | 10 | 0 | 0 |
| | Isosorbide | Parts by mole | 40 | 40 | 20 | 2 | 20 | 0 | 0 | 0 | 0 |
| Isosorbide-derived carbon atom ratio | | % | 11.6 | 11.3 | 3.9 | 0.4 | 4.9 | 0 | 0 | 0 | 0 |
| Content of trivalent or higher monomer component with respect to total number of moles of entire acid components | | mol % | 2 | 10 | 30 | 6 | 6 | 30 | 10 | 6 | 0 |
| Physical properties | Tg | ° C. | 89 | 80 | 64 | 65 | 66 | 58 | 63 | 72 | 50 |
| | Softening temperature | ° C. | 142 | 136 | 143 | 122 | 112 | 135 | 155 | 132 | 90 |
| | Acid value | Mg KOH/g | 14 | 7 | 3.4 | 2.5 | 12 | 2.5 | 7 | 2.7 | 7.5 |
| | Mn | | 3000 | 2500 | 1400 | 2700 | 1500 | 1400 | 3800 | 2300 | 1500 |
| | Mw | | 9700 | 16000 | 39000 | 19000 | 5100 | 44000 | 130000 | 25000 | 4300 |
| | Mp | | 6800 | 4400 | 2000 | 6700 | 3800 | 2000 | 6800 | 8000 | 3800 |
| | Gel fraction | wt % | 4 | 8 | 23 | 0 | 0 | 17 | 12 | 2 | 0 |

The toner thus obtained was evaluated by the evaluation methods described above. The results are presented in Tables 2 and 3. In Tables 2 and 3, TMA represents anhydrous trimellitic acid and TMP represents trimethylolpropane.

a constitutional unit derived from isosorbide and had a softening temperature of higher than 120° C. was singly used therein.

TABLE 2

|  |  |  | Example 1 | Example 2 | Example 3 | Example 4 | Example 5 | Example 6 |
|---|---|---|---|---|---|---|---|---|
| Binder resin for toner | Polyester resin (A) (wt %) | A | 50 | 50 | 50 | — | — | — |
|  |  | B | — | — | — | 50 | — | — |
|  |  | C | — | — | — | — | — | 50 |
|  |  | D | — | — | — | — | 50 | — |
|  | Polyester resin (B) (wt %) | E | — | — | — | — | — | — |
|  |  | F | 50 | — | — | 50 | 50 | — |
|  |  | G | — | 50 | — | — | — | — |
|  |  | H | — | — | 50 | — | — | — |
|  |  | I | — | — | — | — | — | 50 |
|  | Pulverizability index |  | 57 | 43 | 38 | 71 | 40 | 88 |
| Properties of polyester resin (A) | Isosorbide-derived carbon atom ratio (%) |  | 11.6 | 11.6 | 11.6 | 11.3 | 0.4 | 3.9 |
|  | Trivalent or higher monomer component | Kind | TMA | TMA | TMA | TMP | TMA | TMA |
|  |  | Content (mol %) | 2 | 2 | 2 | 10 | 6 | 30 |
| Properties of polyester resin (B) | Softening temperature (° C.) |  | 135 | 155 | 132 | 135 | 135 | 90 |
| Properties of toner | Storage stability |  | ⊙ | ⊙ | ⊙ | ⊙ | ○ | ○ |
|  | Low temperature fixability |  | ○ | ○ | ○ | ○ | ⊙ | ⊙ |
|  | Hot offset resistance |  | ⊙ | ⊙ | ⊙ | ⊙ | ○ | ○ |
|  | Durability |  | ⊙ | ⊙ | ⊙ | ⊙ | ○ | ○ |

TABLE 3

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Binder resin for toner | Polyester resin (A) (wt %) | A | — | — | — | — | 100 | — |
|  |  | B | — | — | — | — | — | — |
|  |  | C | — | — | — | — | — | — |
|  |  | D | — | — | — | — | — | — |
|  | Polyester resin (B) (wt %) | E | 50 | 50 | — | — | — | — |
|  |  | F | 50 | — | 50 | 50 | — | 100 |
|  |  | G | — | — | 50 | — | — | — |
|  |  | H | — | — | — | — | — | — |
|  |  | I | — | 50 | — | 50 | — | — |
|  | Pulverizability index |  | 45 | 92 | 22 | 18 | 41 | 24 |
| Properties of polyester resin (A) | Isosorbide-derived carbon atom ratio (%) |  | — | — | — | — | 11.6 | — |
|  | Trivalent or higher monomer component | Kind | — | — | — | — | TMA | — |
|  |  | Content (mol %) | — | — | — | — | 2 | — |
| Properties of polyester resin (B) | Softening temperature (° C.) |  | 112, 135 | 112, 90 | 135, 155 | 135, 90 | — | 135 |
| Properties of toner | Storage stability |  | ○ | ○ | ⊙ | ○ | ⊙ | ○ |
|  | Low temperature fixabilit |  | ⊙ | ⊙ | ○ | ⊙ | X | ○ |
|  | Hot offset resistance |  | Δ | X | ⊙ | ○ | ⊙ | ⊙ |
|  | Durability |  | X | X | ⊙ | ⊙ | X | ○ |

As presented in the results, the binder resins for toner used in the toners of Examples 1 to 6 had a pulverizability index of 25 or more and exhibited excellent pulverizability. In addition, the toners of Examples 1 to 6 exhibited excellent storage stability, low temperature fixability, hot offset resistance, and durability.

On the contrary, the toners of Comparative Examples 1 and 2 exhibited poor durability since the polyester resin E which contained a constitutional unit derived from isosorbide and had a softening temperature of 120° C. or lower was used therein.

The binder resins for toner used in the toners of Comparative Examples 3 and 4 exhibited poor pulverizability since polyester resins which both did not contain a constitutional unit derived from isosorbide were combined therein.

The toner of Comparative Example 5 exhibited poor durability since a polyester resin A which contained contain The binder resin for toner used in the toner of Comparative Example 6 exhibited poor pulverizability since the polyester resin F which did not contain a constitutional unit derived from isosorbide was singly used therein.

INDUSTRIAL APPLICABILITY

The binder resin for toner of the invention is used in the production of a toner. According to the binder resin for toner of the invention, a toner exhibiting excellent storage stability, low temperature fixability, non-offset property, and durability can be obtained. In addition, it is possible to favorably pulverize the kneaded product and to enhance the productivity of toner in the case of producing a toner through a step of melting and kneading a material for toner such as a binder resin for toner and pulverizing the kneaded product thus obtained.

The toner of the invention can be used in development of an electrostatic image or a magnetic latent image in an electrophotographic method, an electrostatic recording method, an electrostatic printing method, or the like.

The invention claimed is:

1. A binder resin, comprising:
   a polyester resin (A) comprising a constitutional unit derived from isosorbide and has a softening temperature of higher than 120° C.; and
   a polyester resin (B) different from the polyester resin (A), wherein
   the binder resin has a pulverizability index of 25 or more,
   a weight average molecular weight (Mw) of the polyester resin (B) is from 500 to 1,000,000, and
   a glass transition temperature of the polyester resin (B) is from 35° C. to 82° C.

2. The binder resin according to claim 1, wherein a ratio of the number of carbon atoms contained in a constitutional unit derived from isosorbide to the number of entire carbon atoms contained in the polyester resin (A) is from 0.1% to 30%.

3. The binder resin according to claim 1, wherein the polyester resin (A) is a polycondensate of a monomer mixture comprising either or both of a tri- or higher polycarboxylic acid and a trihydric or higher polyhydric alcohol in a range of from 0.1% to 80% by mole with respect to the total number of moles of entire acid components.

4. The binder resin according to claim 1, wherein a softening temperature of the polyester resin (B) is higher than 120° C.

5. The binder resin according to claim 4, wherein the softening temperature of the polyester resin (B) is from >120° C. to 165° C.

6. The binder resin according to claim 1, wherein a softening temperature of the polyester resin (B) is 120° C. or lower.

7. The binder resin according to claim 6, wherein the softening temperature of the polyester resin (B) is from 75° C. to 120° C.

8. The binder resin according to claim 1, wherein a ratio of the number of carbon atoms contained in a constitutional unit derived from isosorbide to the number of entire carbon atoms contained in the polyester resin (B) is less than 1%.

9. The binder resin according to claim 1, wherein a mass ratio of the polyester resin (A) to the polyester resin (B) is from 5:95 to 95:5.

10. A toner comprising the binder resin according to claim 1.

11. A method for producing the toner according to claim 10, the method comprising:
    melting and kneading a mixture comprising the polyester resin (A) and the polyester resin (B); and
    pulverizing a kneaded product thus obtained.

12. The binder resin according to claim 1, wherein the softening temperature of the polyester resin (A) is from 122° C. to 160° C.

13. The binder resin according to claim 1, wherein a glass transition temperature of the polyester resin (A) is from 40° C. to 82° C.

14. The binder resin according to claim 1, wherein an acid value of the polyester resin (A) is from 0.1 to 50 mg KOH/g.

15. The binder resin according to claim 1, wherein an acid value of the polyester resin (B) is from 0.1 to 50 mg KOH/g.

16. The binder resin according to claim 1, wherein a mass ratio of the polyester resin (A) to the polyester resin (B) is from 25:75 to 75:25.

17. The binder resin according to claim 1, wherein a mass ratio of the polyester resin (A) to the polyester resin (B) is from 40:60 to 60:40.

18. The binder resin according to claim 1, further comprising an additional binder resin other than the polyester resin (A) and the polyester resin (B), wherein a content of the additional binder resin is 25 parts by mass or less with respect to 100 parts by mass of the sum of the polyester resin (A) and the polyester resin (B).

19. The binder resin according to claim 1, further comprising an additional binder resin other than the polyester resin (A) and the polyester resin (B), wherein a content of the additional binder resin is 20 parts by mass or less with respect to 100 parts by mass of the sum of the polyester resin (A) and the polyester resin (B).

* * * * *